United States Patent [19]
Mussino et al.

[11] Patent Number: 5,812,297
[45] Date of Patent: Sep. 22, 1998

[54] BIAS SYSTEM IN AN OPTICAL CATV MODULATOR

[75] Inventors: Franco Mussino, Turin; Giuseppe Ravasio, Capriate; Claudio Zammarchi, Milan, all of Italy

[73] Assignee: Pirelli Cavi S.p.A., Italy

[21] Appl. No.: 720,463

[22] Filed: Sep. 30, 1996

[30] Foreign Application Priority Data

Oct. 12, 1995 [IT] Italy .................................. MI95A2085

[51] Int. Cl.$^6$ .................................................. H04B 10/00
[52] U.S. Cl. ........................ 359/181; 359/161; 359/180; 359/187; 359/188
[58] Field of Search .................... 359/161, 180, 359/181, 187, 188

[56] References Cited

U.S. PATENT DOCUMENTS

| | | | |
|---|---|---|---|
| 5,161,044 | 11/1992 | Nazarathy et al. | 359/187 |
| 5,321,543 | 6/1994 | Huber | 359/187 |
| 5,453,868 | 9/1995 | Blauvelt et al. | 359/188 |
| 5,526,164 | 6/1996 | Link et al. | 359/187 |
| 5,617,240 | 4/1997 | Hergault et al. | 359/161 |

FOREIGN PATENT DOCUMENTS

| | | | |
|---|---|---|---|
| 407919A2 | 7/1990 | European Pat. Off. | H04B 10/18 |
| 594088A1 | 10/1993 | European Pat. Off. | H04B 10/14 |

*Primary Examiner*—Edward Lefkowitz
*Attorney, Agent, or Firm*—Brooks Haidt Haffner & Delahunty

[57] ABSTRACT

An analog-external-modulation optical, emitter is described which comprises an electro-optical modulator and a piloting circuit. The piloting circuit comprises a pilot-tone-generating circuit; an electric control signal generated by the optical signal coming out of the modulator and a predetermined bias voltage are fed to the input of a differential amplifier the output of which is added to the pilot tone to feed an electric input of the electro-optical modulator. The RF input of the analog electric signal is connected to a linearizer circuit to which the pilot-tone-generating circuit is also connected. The output of the linearizer circuit is sent to an electric input of the electro-optical modulator through a band-stop filter adapted to eliminate the pilot tone downstream of the linearizer circuit.

12 Claims, 4 Drawing Sheets

BIAS SYSTEM IN AN OPTICAL CATV MODULATOR

DESCRIPTION

The present invention relates to a method of carrying out the analog modulation of an optical signal and to an analog-external-modulation optical emitter.

The present invention also relates to a control system for controlling the operating point or bias point of an optical modulator used in CATV installations.

It is known that the distribution of television signals by CATV (i.e. CAble TeleVision) can be carried out not only by means of coaxial-cable networks but also by the use of optical fibres or of a mixed system (involving fibres+coaxial cables).

The optical-signal modulation can be achieved either directly (by intervention on the optical source, usually a laser) or indirectly, by an optical modulator.

An indirect optical modulator enabling the amplitude modulation to be carried out by a modulating signal (also referred to as external signal) of very high frequencies (as in the case of carriers for television channels conventionally ranging from 40 to 860 MHz) consists for example of a Mach-Zehnder type interferometer built up on lithium niobate ($LiNbO_3$).

The electrooptical characteristic of modulators (optical output power depending on the input radio-frequency voltage) is typically non-linear. In order to limit the signal distortion it is suitable for the modulator to operate close to a portion of the characteristic which is as linear as possible.

For the purpose, in an electrooptical modulator a radio-frequency (RF) modulating signal is applied to a RF electrode, and applied to the same electrode or to a second bias electrode is a continuous bias voltage determining the modulator bias point.

The modulating signal applied to the RF input for example consists of the whole of the modulated carriers of the television channels to be distributed to subscribers.

In the case of a Mach-Zehnder modulator the course of the characteristic can approach a sinusoid and it is advantageous for the modulator to operate close to the inflexion point of the sinusoid, at an applied bias voltage $V_Q$ (bias point).

The modulation characteristic of the Mach-Zehnder modulator, with reference to the bias point, can be expressed by the relation:

$$P_U = K_z \, \text{sen} \, \beta \quad (1)$$

wherein:

$P_U$ is the optical output power $K_z$ is a coefficient depending on the Mach-Zehnder modulator characteristic $\beta = \pi V/V_\pi$ is the modulation index of the modulated signals, which index is expressed in radiants V is the applied-voltage variation, with respect to the bias point $V_Q$ $V_\pi$ is a constant.

This characteristic having a sinusoidal course is identified by two values:

the value of a voltage referred to as $V_\pi$, representing the voltage variation to apply to the RF (radio-frequency) electrode to bring the optical power from the maximum value to the minimum value;

the value of voltage $V_Q$ which is to be applied to the bias electrode in order to make the bias point correspond to the inflection point of the characteristic having a sinusoidal course, that is an odd symmetry. In this case the even-order distortions (comprising the second harmonic of the applied signals) are cancelled and the odd-order distortions take a well defined value.

For example, in the case of a Mach-Zehnder modulator of the PIR PIM1510 type, manufactured by the Applicant, said voltages can take the following values:

$V_\pi = 4.3 \, V \quad V_Q = 0.7 \, V.$

The $V_Q$ voltage value of the bias point is not constant, but it varies in time (due to accumulation of static charges in $LiNbO_3$, for example) and also with temperature variations.

Therefore, the bias voltage value must be continuously adjusted, for example using as information the presence and quantity of the even-order distortions or the second-order intermodulation products, generally identified as CSO (Composite Second Order). The bias point voltage must be applied and maintained by an appropriate circuit.

Even in the case of operation of the modulator at the bias point, the nonlinearity of the input-output characteristic causes residual distortions, in particular giving rise to intermodulation products of the third order between the modulated signals generally identified as CTB (Composite Triple Beat).

In order to restrict these distortions to some extent, it is suitable that the selected modulation depth for the modulating signals should not be too high (where by modulation depth it is intended the maximum value, expressed in percent, of the modulation index $\beta$), a modulation of about 4% per channel for example, in the case of the Mach-Zehnder modulator employed by the Applicant, so that operation can take place as much as possible close to the linear portion of the characteristic.

In order to reduce residual distortions, and first of all third-order distortions, the technique of predistorting the modulating signals was suggested, so that predistortion shall be compensated for by the subsequent distortion on the part of the modulator; for the purpose, it is possible to put a circuit, referred to as linearizer circuit, ahead of the modulator, which circuit has an input-output characteristic for the RF signals which is the reverse function of the modulator input-output characteristic.

This technique is for example disclosed in an article by M. Nazarathy et al "Progress in Externally Modulated AM CATV Transmission Systems", published in the Journal of Lightwave Technology, vol. 11, No. 1, 01/93, pages 82–104.

Therefore, after selecting an appropriate modulation depth for the modulating signals, the modulator must be equipped with appropriate circuits enabling accomplishment of two functions:

a) applying the bias voltage and keep it to the required value for making the modulator operate at the inflexion point of the sinusoidal characteristic;

b) linearizing the modulator characteristic, by means of predistortion circuits.

Together with the application of the bias voltage, it is possible to apply a sinusoidal signal called "pilot tone" of a predetermined amplitude and frequency ($f_1$) (generally much lower than the minimum frequency of the RF signal band) and to detect, by an appropriate circuit, the presence in the optical output signal of the even harmonics of the pilot tone (the second harmonic $2f_1$, for example). The bias voltage is such adjusted that the value of this second harmonic is minimized.

This technique, in order to enable an appropriate stabilization of the bias point corresponding to CSO in the order of 65–70 dB, needs a high modulation depth of the pilot tone (about 10%, based on the experiments carried out by the Applicant), so as to avoid disturbances linked to noise, especially the intrinsic photodiode noise.

A problem arising from this technique for stabilizing the bias point is due to the fact that the presence of a pilot tone, together with the modulating signals, produces third-order beats which add up to the third-order beats between the modulating signals, which are in any case present due to the nonlinear (sinusoidal, for example) modulator characteristic. In order to restrict the quantity of such distortions it is necessary, in contrast to what previously pointed out, to keep the modulation depth of the pilot tone within very low values (approximately 1%), which, as a result, brings about the achievement of very low signal/noise ratios for the feedback control signal of the bias voltage stabilizing loop and therefore a weak efficiency of the loop itself.

The selection of the pilot tone frequency and the related modulation depth can be carried out by applying several television channels to the modulator and looking for the presence of possible disturbances (generally in the form of transverse bars) on each of them, depending on the width and frequency of the applied tones.

The Applicant has experimented that with a pilot tone having a frequency $f_1$ of 10.7 MHz, the maximum width applicable to the modulator (bias electrode) is about 12 mV, in order that the interference generated on the test image of a television channel should not be visible. This width corresponds to a modulation depth of about 1.2%, which depth is inappropriate to achieve a good signal/noise ratio.

In order to reduce the quantity of the intermodulation products between the modulating RF signals (the television carriers, for example), it is possible to employ, as said, the linearization-by-distortion technique.

This technique can be also used for the pilot tone of the bias voltage control. In this case it is necessary to send the pilot tone together with the RF signals, that is they are to be sent to the input of the modulator predistortion circuit. Thus, both beats between the modulating signals and beats between the signals themselves and the pilot tone are linearized.

The Applicant could see that this involves further practical difficulties, in that the circuits amplifying the signals before sending them to the modulator are generally band-limited (they are for example limited to the 40–860 MHz television band) externally of which band it is impossible to obtain a satisfactory behaviour (width and phase linearity), capable of compensating for further third-order distortions introduced by the pilot tones used to control the bias voltage.

According to the present invention these difficulties are overcome by a new method enabling the use of amplifiers with a band limited to the modulating signal band (for example, with a 40–860 MHz band in the case in which the modulating signals are the whole of the carriers of television signals), without making it necessary to use amplifiers of a wider band extended to the low frequencies so as to include the pilot tones, which amplifiers are expensive and of difficult accomplishment.

The present invention also enables the modulation depth of the pilot tone to be increased up to 10% without high-level third-order distortions being produced, and therefore enables a high efficiency of the bias-voltage stabilization loop to be achieved.

In one aspect, the present invention relates to a method of analogically modulating an optical signal in correspondence with a signal of a frequency within a band of predetermined width, comprising:

feeding an optical input signal to an electro-optical modulator;

feeding an external electric signal of a frequency within said band to a linearizer circuit and correspondingly generating at the output a predistorted electric signal having a predistortion of predetermined characteristics;

feeding said predistorted electric signal to the input of said electro-optical modulator;

feeding an electric bias signal to the input of said electro-optical modulator;

generating an optical modulated signal in said electro-optical modulator;

wherein said step of feeding an electric bias signal comprises:

generating an electric piloting signal (pilot tone) at a predetermined frequency;

generating an electric control signal in correspondence with said modulated optical signal;

generating an electric bias signal in correspondence with said electric control signal, said pilot tone and with a reference signal of predetermined voltage, in combination with each other;

characterized in that it further comprises:

feeding said pilot tone in superposition with said external electric signal to the input of said linearizer circuit;

attenuating said pilot tone at the output of said linearizer circuit before feeding said predistorted electric signal to said electro-optical modulator.

Preferably said predetermined frequency is external to said band of predetermined width.

Preferably said step of generating an electric control signal comprises separating a fraction of said modulated optical signal and detecting an electric feedback signal corresponding thereto and more preferably drawing the component at said predetermined frequency from said electric feedback signal.

In a particular embodiment, said method comprises the steps of:

generating a first and a second electric piloting signal (pilot tones), at a first and a second predetermined frequencies, respectively;

feeding said first and second pilot tones in superposition with said external electric signal to the input of said linearizer circuit;

attenuating said first and second pilot tones at the output of said linealizer circuit before feeding said predistorted RF signal to said electrooptical modulator, and wherein said step of generating an electric control signal comprises drawing from said electric feedback signal, the component at the frequency difference between said first and second predetermined frequencies.

Preferably, said first and second predetermined frequencies are external to said band of predetermined width.

According to an advantageous version of this particular embodiment, this method comprises:

drawing from said electric loop signal, a second component at the frequency difference between twice one of said first and second predetermined frequencies and the other of said first and second predetermined frequencies;

generating a linearization control signal based on said second component;

controlling said linealizer in a parametric manner, based on said linearization control signal, so as to minimize the third-order distortions of said modulated optical signal.

In a further particular embodiment of said method, said external electric signal comprises at least two spaced apart frequencies in said band and said step of generating a predistorted electric signal comprises generating second-order and third-order intermodulation products between said frequencies and pilot tone, of such characteristics that they are superposed in substantial phase opposition with the corresponding intermodulation products generated within said electrooptical modulator.

Preferably, said method comprises attenuating said pilot tone by at least 10 dB at the output of said linealizer circuit.

More preferably, said step of attenuating said pilot tone at the output of said linearizer circuit comprises filtering said pilot tone by a band-stop filter, or it comprises adding, at the output of said linearizer circuit, a signal obtained at said pilot tone, varying the phase and width of same according to predetermined quantities.

In a second aspect, the present invention relates to an analog-external-modulation optical emitter comprising an optical source, an electrooptical modulator and a piloting circuit of said electrooptical modulator, said electrooptical modulator having:

an optical input for an optical signal in connection with said optical source, a first electric input for a modulating voltage, a second electric input for a bias voltage, and an optical output carrying an analog modulated optical signal, an optical coupler being connected to said optical output of said modulator, which optical coupler has a branch carrying one modulated-optical-signal portion in connection with an optical receiver, adapted to generate an optical control signal in correspondence with said optical signal;

in which said piloting circuit comprises:

an input for an analog external optical signal, a linearizer circuit receiving said external signal and connected to said first electric input of said electrooptical modulator;

an input for a predetermined bias voltage;

an input for said electric control signal generated by said optical receiver;

a circuit generating an electric piloting signal (pilot tone);

said predetermined bias voltage and electric control signal being fed to the input of a differential amplifier, the output of said differential amplifier being combined with said electric piloting circuit and the combination being fed to said second electric input of said electrooptical modulator;

characterized in that the circuit generating an electric piloting signal is also connected, via a band-pass filter and an attenuator-phase shifter circuit, to the input of said linearizer circuit and the output of said linearizer circuit is then sent to said first electric input of said electrooptical modulator by interposition of a band-stop filter adapted to eliminate said electric piloting signal downstream of said linearizer circuit.

More details will become apparent from the following description, with reference to the accompanying drawings, in which.

Figure 1:
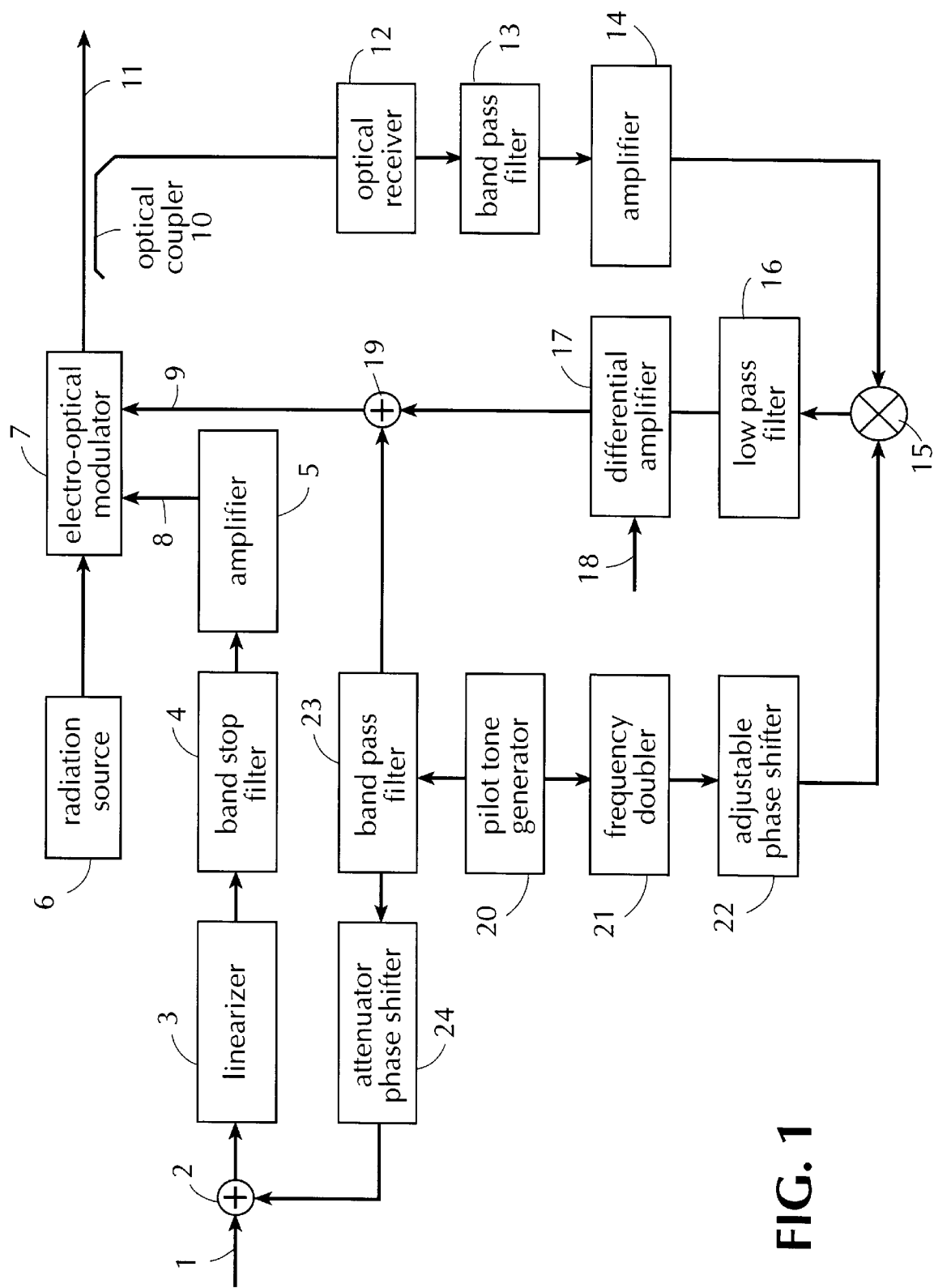
FIG. 1 is a diagram of an analog-external-modulation optical emitter.

An analog-external-modulation optical emitter according to the present invention will be now illustrated with reference to the block diagram of FIG. 1.

An input for electric radio-frequency (RF) modulating signals included within a given frequency band has been identified by reference numeral 1. Input 1 is connected to one of the inputs of a summation node 2, the output of which is connected to a linearizer 3. This linearizer is formed of a predistorter circuit, provided with one input-output characteristic (output voltage depending on the input voltage) selected as stated in the following. Linearizer 3 is followed by a band-stop filter 4, centered on the frequency of a pilot tone described later, and an amplifier 5, operating in the frequency band of the RF signals.

The output of amplifier 5 is connected to an electrode 8 of an electrooptical modulator 7. Electrode 8 is arranged for the input of RF modulating signals.

A second electrode 9 of modulator 7 is arranged for the input of a bias signal, by which the modulator bias point is determined.

While the presence of two separate electrodes for the modulating and bias signals is preferred to the ends of the present invention, in place of the stated modulator it is possible to employ an electrooptical modulator provided with one control electrode alone, wherein the modulating and bias signals are combined by means of an appropriate circuit.

Connected to an optical input of modulator 7, by an optical fibre for example, is a radiation source 6 capable of generating a continuous optical signal. This source may consist of a laser, in particular of the semiconductor type.

The optical modulator output is connected, by an optical fibre for example, to an optical coupler 10 adapted to separate the radiation coming from modulator 7 so as to send part of same, preferably in the range of 80% to 99.5%, more preferably in the range of 90% to 99%, to an optical output 11, and the remaining part to an optical receiver 12 comprising a photodiode, for example.

The input-output characteristic of the linearizer 3 must be selected based on the input-output characteristic of the electrooptical modulator 7, so as to compensate for the nonlinearity of the latter, or so as to obtain a relation as much as possible linear between the power of the optical signal coming out of the modulator and the modulating signal voltage present at the input 1; in particular it must be such selected as to minimize the third-order distortions.

An electric RF signal, called pilot tone, of frequency $f_1$ lower than the lower limit of the modulating signal band, is generated by a generator 20.

Connected to generator 20 is a band-pass filter 23, centered on frequency $f_1$ and adapted to attenuate a possible component at frequency $2f_1$ (second harmonic of the pilot tone). Connected to the band-pass filter 23 is an attenuator-phase shifter 24, in turn connected to a second input of the summation node 2. Phase-shifting and attenuation of the attenuator-phase shifter 24 can be adjusted, as stated in the following.

The electric signal generated by receiver 12 in correspondence with the optical signal from coupler 10 is sent to a band-pass filter 13, centered on frequency $2f_1$; connected to the output of the band-pass filter 13 is an amplifier 14, the output of which ends up in a first input of an analog multiplier 15.

The analog multiplier 15 carries out the coherent detection of the signal at frequency $2f_1$ coming from receiver 12 through the band-pass filter 13 and amplifier 14; thus a tone at the second harmonic of the pilot tone and coming, via an adjustable phase shifter 22, from a frequency doubler 21 connected to generator 20, is sent to a second input of the analog multiplier 15.

The adjustable phase shifter 22 is such adjusted that it optimizes the demodulation of the signal at frequency $2f_1$ coming from amplifier 14.

The analog multiplier 15 output is connected to the low-pass filter 16 eliminating the high-frequency components, so that at the output of same only the continuous component corresponding to the detected signal is present.

A reference bias signal 18 and the detected signal from the low-pass filter 16 are respectively connected to the two inputs of the differential amplifier 17.

The differential amplifier 17 output is connected to an input of the summation node 19, in which the pilot tone coming from the band-pass filter 13 and connected to a second input of the summation node 19 is superposed with the signal from the differential amplifier 17; the output of the summation node is connected to the bias electrode 9 of the electrooptical modulator 7.

The optical connections, as well as the electric circuits relative to the operating blocks forming the device of FIG. 1, can be made following known techniques.

Operation of the device takes place as follows.

The bias voltage control is carried out by injecting a known-frequency signal (not interfering with the television channels) into the modulator 7 and detecting the amplitude and sign of an even harmonic of this signal, in particular of the second harmonic, since the amplitude of same is greater than that of the harmonics of a higher order.

The amplitude and sign of the second harmonic can be emphasized by a synchronous detector comparing the second harmonic present in the signal at the modulator 7 output (converted to an electric form by a photodiode), with the second harmonic of the signal injected into the modulator itself.

In particular, the signal of an oscillator 20 of appropriate amplitude and frequency $f_1$ (generally below the minimum frequency of the television channels equal to about 40 MHz) is applied to the RF input port 9 of the modulator. Supposing that the bias voltage is not the optimal one, also the even harmonics (in addition to the odd harmonics) of the applied signal will be present at the modulator output.

By an optical coupler 10 a fraction of the optical output power is drawn from modulator 7 and it is sent to the photodiode of the receiver 12 converting it into an electric signal.

The signal is subsequently (13, 14) amplified in a selective manner at the frequency of the second harmonic. This signal is compared (amplitude and sign) through the synchronous demodulator, with the signal from oscillator 20, and frequency-doubled (21). An analog multiplier 15 is used as the synchronous demodulator.

The demodulator output consists of a continuous component and a second-order beat of the signals entering the analog multiplier 15, which beat is eliminated by the low-pass filter 16.

The continuous-component value depends on the deviation of the bias voltage from the optimal value, because it depends on the amplitude and phase of the second harmonic present at the modulator output.

It can be seen that the smaller the deviation of the bias voltage from the optimal value, the greater the attenuation of the composite second order (CSO).

In the device of the present invention, the problems related to the stability and response of the bias voltage-controlling loop (feed-back loop) can be solved by an appropriate selection of the compensation pole, after determining the overall loop response.

The device also provides that the pilot tone should be sent to the linearizer 3 together with the modulating signals. In this manner in the predistortion circuit there is the generation of the signals compensating for the distortions produced in the modulator by superposition of the modulating signals with the pilot tone applied to the modulator together with the bias controlling voltage.

The pilot tone sent to the linearizer 3 must be such that it can be suitably amplitude- and phase-varied, by a variable attenuator-phase shifter, in order to obtain the maximum elimination of the third-order beats between the pilot tone and the modulating signals.

According to the present invention, only the predistortion circuit 3 (and in particular the input circuits thereof) must have an appropriate response to the pilot tone frequency, whereas the amplifier does not require such a response.

In order to avoid the pilot tone reaching the optical modulator through the amplifier, it is possible to introduce a band-stop filter 4 between the predistortion circuit and the amplifier, so as to conveniently attenuate (attenuation of at least 10–15 dB) the pilot tone.

Alternatively, it is possible to efficiently attenuate the pilot tone by adding, after the linearizer, the pilot tone itself with opposite phase. In more detail, in place of the band-stop filter 4, a summation node, not shown in the figure, can be connected between the predistorsion circuit 3 and the amplifier 5, in order that a signal, obtained from the pilot tone by modifying its phase and amplitude so to minimize the output component at the pilot-tone frequency, is added to the signal from the predistorsion circuit 3 by means of said summation node.

This alternative solution has the advantage of modifying the spectrum of the signal entering the amplifier only at the exact frequency of the pilot tone.

EXAMPLE

Still with reference to the block diagram of FIG. 1, an example of a device according to the present invention made by the Applicant will be now described.

The used electrooptical modulator is a Mach-Zehnder-type modulator, model PIR PIM1510, produced by the Applicant.

The pilot tone is generated by a quartz oscillator 20 at a frequency $f_1=10.7$ MHz. The frequency selection essentially depends on practical reasons, since band-pass filters at said frequency and also at a double frequency ($2f_1=21.4$ MHz), to be used in the circuits following the optical receiver (photodiode) are easily available on the market.

The tone at frequency $f_1=10.7$ MHz applied to the Mach-Zehnder modulator 7 has a level such that a modulation depth of about 10% is introduced.

The tone at frequency $f_1=10.7$ MHz is frequency-doubled before being sent to the coherent detector consisting of the analog multiplier 15, at which also the signal drawn from the modulator 7 output arrives, by means of an optical coupler 90%–10% picking up a 10% portion of the optical output power.

After opto-electrical conversion carried out by the photodiode, the signal is amplified and filtered at the frequency $2f_1=21.4$ MHz. In addition to the second-harmonic signal ($2f_1=21.4$ MHz), the photodiode also detects the fundamental frequency ($f_1=10.7$ MHz) having an amplitude about 70 dB greater. Therefore, the introduction of a filter eliminating the fundamental frequency is necessary in order to avoid the subsequent circuits being overcharged, which will result in the generation of a signal at the second-harmonic frequency, before the synchronous detection, thereby altering operation of same.

The phase of the signal with frequency of 21.4 MHz that is inputted to the analog multiplier 15 can be adjusted for optimizing demodulation, by means of the adjustable phase shifter 22 following the frequency doubler 21. The optimal adjustment is found by maximizing the continuous-voltage variation at the synchronous demodulator output for a given variation of the modulator bias voltage $V_Q$.

The voltage outputted from the analog multiplier 15 is conveniently filtered by a low-pass filter 16 letting only the continuous component pass and eliminating other undesired signals. This voltage is compared, by the differential amplifier 17, with the reference bias voltage 18 and applied to the optical modulator 7, together with the pilot tone.

The pilot tone injected into the linearizer 3 must be conveniently filtered too, in order to avoid the introduction of spurious tones with respect to the pilot tone; in addition, it must be conveniently amplitude- and phase-adjusted (by an attenuator and a phase shifter, respectively) so as to minimize the (third-order) intermodulation products generated around the television carriers.

Amplifier 5 is a common CATV amplifying module operating in the 40–860 MHz band, and more particularly model CA922A, manufactured by Motorola.

It is pointed out that it is not necessary to resort to amplifying modules operating at the pilot tone frequency, in particular at frequencies down to less than 10 MHz; this would require the use of input and output transformers of difficult construction, because an increase in the primary and secondary inductance of the transformers, which increase would be necessary to improve the response of said transformers towards low frequencies, would bring about an increase in the stray capacitances such as to reduce the high frequency response down to values lower than 860 MHz, as required for covering the whole UHF television band.

Figure 2:
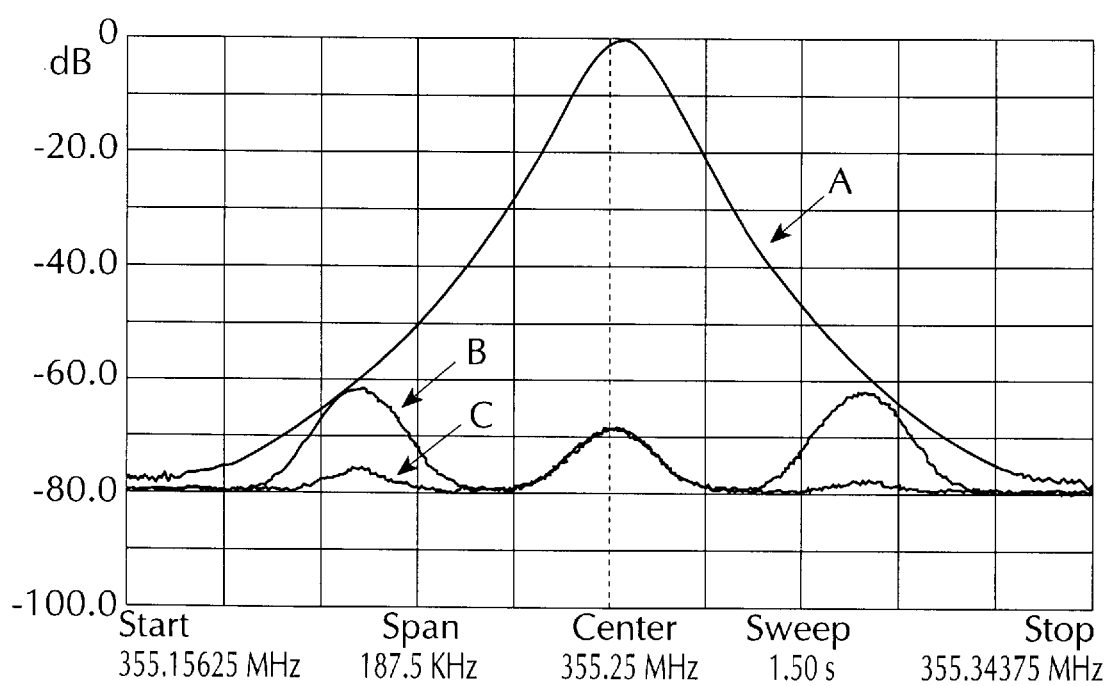
FIG. 2 is a graph of the experimental results obtained in one embodiment of the present invention.

Experimental results related to the described example are reproduced in the graphs of FIG. 2. The x-axis corresponds to frequencies, whereas the RF spectra expressed in dB, standardized with respect to the considered carrier are reproduced along the y-axis.

For the experiment, used as the modulating signal was the whole (with equalization of ±0.2 dB) of the 80 carriers corresponding to the NTSC television standard, with frequencies included between 55.25 and 547.25 MHz.

In particular, curve A corresponds to the RF spectrum of the television channel transmission carrier centered at the frequency of 355.25 MHz.

Curves B and C, instead, reproduce the RF spectra measured after quenching of the carrier at the frequency of 355.25 MHz, in the presence of the remaining carriers. The centre peak is due to the third-order intermodulation between the remaining carriers. The side peaks are instead due to the third-order intermodulation between the remaining carriers and the pilot tone at the frequency of 10.7 MHz.

In the depicted experimental configuration curve C was achieved. Curve B was instead achieved in a configuration otherwise identical with the preceding one, in which connection between the attenuator-phase shifter 24 and the summation node 2 had been cut off so as to stop input of the pilot tone into the linearizer 3.

One can see that in the device of the present invention (curve C) the third-order intermodulation between the carriers and pilot tone (CTB) has a value lower than −75 dB whereas, in the device in which the pilot tone is not injected into the linearizer (curve B), CTB<−62 dB.

The present invention enables a high modulation depth to be adopted for the pilot tone, so as to avoid noise-linked disturbances, above all the intrinsic photodiode noise, while at the same time reducing the CTB between the pilot tone and television carriers.

In particular, by sending the pilot tone together with the television signals to the input of the modulator predistortion circuit, both beats between the television carriers and beats between the carriers and the pilot tone are linearized.

In the device according to the present invention, as so far described, minimization of the third-order distortions due to beats between the television carriers is achieved by means of the linearizer which is adjusted in a constant and non parametric manner.

While a device making us of one pilot tone alone has been described, a system according to the present invention can be accomplished by using two pilot tones.

For the purpose it is possible to apply two pilot tones of predetermined amplitude and frequency ($f_a$, $f_b$), together with the bias voltage. In this manner, two control signals can be obtained, one to minimize the second-order distortions and one to minimize the third-order distortions, for example utilizing the beats:

$f_a-f_b$ (second order)

$2f_a-f_b$ or $2f_b-f_a$ (third order).

Frequencies $f_a$ and $f_b$, too, are generally selected of a much lower value than the frequencies of the RF modulating signals (the television channels, for example).

Figure 3:
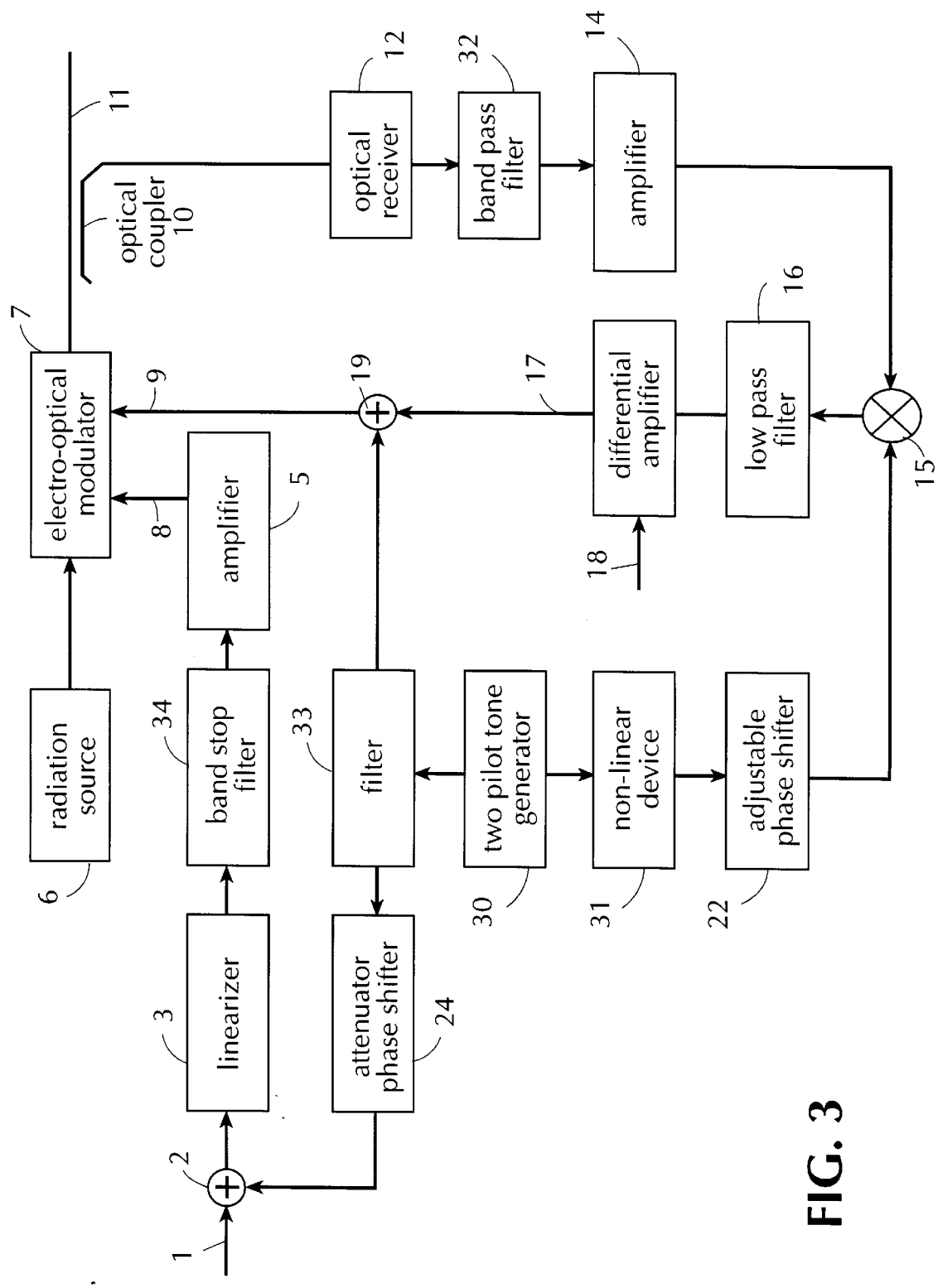
FIG. 3 is a diagram of an analog-external-modulation optical emitter employing two pilot tones.

FIG. 3 shows a block diagram relative to a device according to the present invention employing two pilot tones. In FIG. 2, components that are analogous to those in the device of FIG. 1 have been allocated the same reference numerals.

In FIG. 3 denoted by 30 is a two-pilot-tone generator with predetermined frequencies $f_a$ and $f_b$ and by 31 a non linear device connected to the preceding generator and capable of producing a signal at the beat frequency $f_a-f_b$, starting from the pilot tones.

Denoted by 33 is a filter capable of transmitting the pilot tone frequencies and attenuating the other frequencies; 34 identifies a band-stop filter adapted to attenuate the two pilot tone frequencies. 32 is a band-pass filter centered on frequency $f_a-f_b$.

The device of FIG. 3 enables the bias point of modulator 7 to be stabilized, by minimizing the beat at frequency $f_a-f_b$ in the optical receiver 12. The device, like that of FIG. 1, also enables the third-order beats between the television carriers and the two pilot tones to be reduced.

In addition, this device enables the signal/noise ratio for the feedback signal of the bias voltage stabilizing loop to be improved, the modulation depth of the pilot tone remaining unchanged. In fact, beat at frequency $f_a-f_b$ is more intense, for an equivalent displacement with respect to the bias point, than the corresponding signal at the second harmonic of the pilot tone that would be measured in the device using a single pilot tone.

Figure 4:
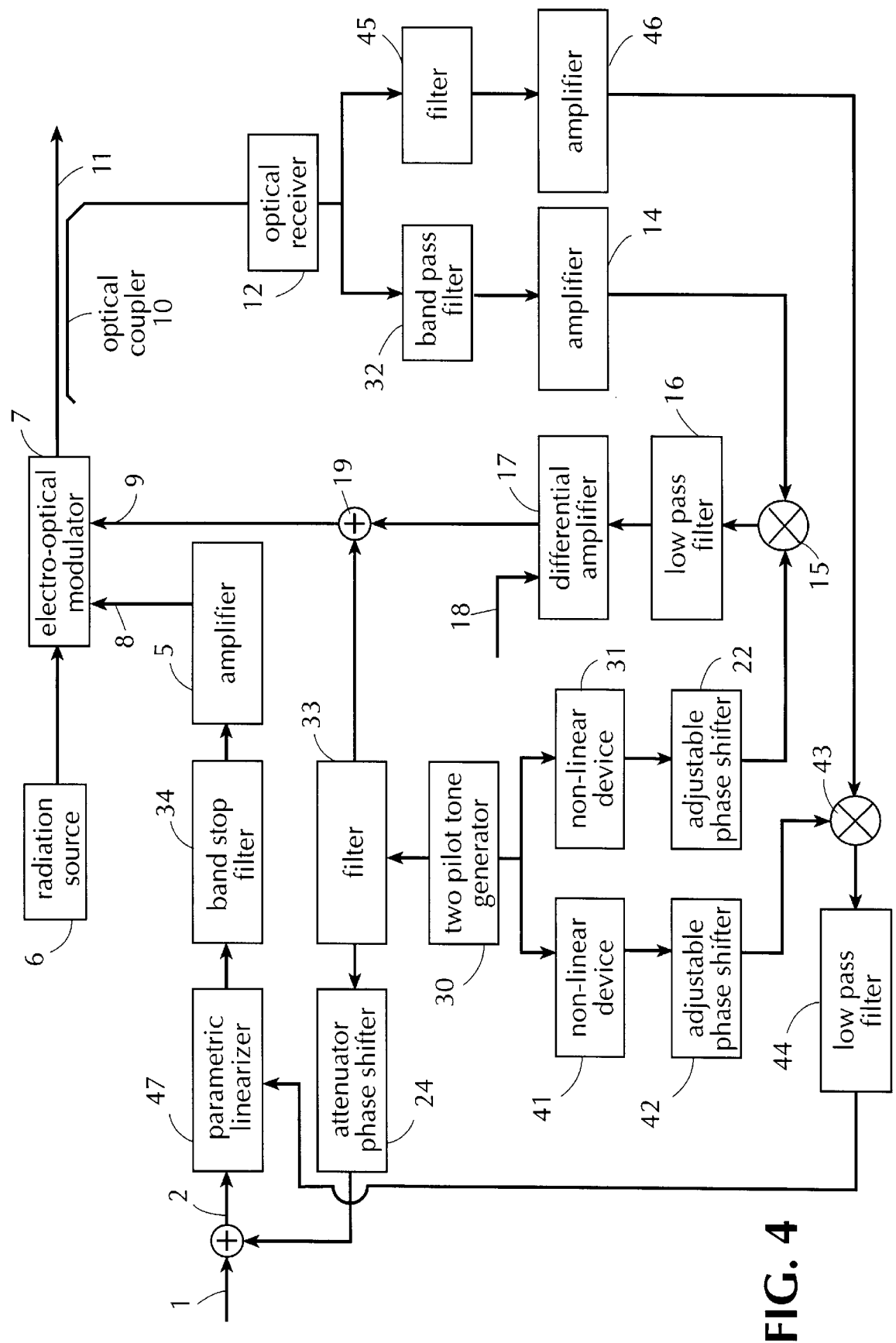
FIG. 4 is a diagram of an analog-external-modulation optical emitter employing two pilot tones and provided with a parametric control of the third-order distortions.

The device of the present invention as shown in the block diagram of FIG. 4, in addition to enabling the bias voltage control, also allows the third-order intermodulation products to be controlled, by acting on the linearization circuit. In this way a parametric adjustment of both second order and third order intermodulation products is achieved.

In FIG. 4, components that are analogous to those of the device of FIG. 3 have been allocated the same reference numerals.

Denoted by 41 is a non-linear device connected to the pilot tone generator 30 capable of producing a signal at the beat frequency $2f_a-f_b$, starting from the pilot tones; 42 identifies an adjustable phase shifter, 43 an analog multiplier and 44 a low-pass filter connected to an amplifier. Component 44 lets the continuous component pass and eliminates the second-order beat of the signals entering the analog multiplier 43.

Components 41, 42, 43, 44 altogether form a synchronous demodulator of the signal at frequency $2f_a-f_b$ coming from the optical receiver 12 through filter 45, that behaves as band-pass at the same frequency, and amplifier 46.

This signal at frequency $2f_a-f_b$, linked to the third-order beats, is used after demodulation to control a parametric linearizer 47 connected to the output of filter-amplifier 44.

The feedback loop comprising filter 45, analog multiplier 43 and parametric linearizer 47 enables the CTB of the device to be conveniently minimized, under variation of the non-linearity parameters of the modulator 7 and of any other optical or electronic component, in the path of the modulating signal, being comprised between the linearizer 3 and optical receiver 12.

Circuit examples of the bias-voltage control systems employing two pilot tones, corresponding to the devices of FIGS. 3 and 4, can be made, in whole similarity with the example described in connection with the case of a single pilot tone, by applying two pilot tones at the frequencies of 33.4 MHz and 38.9 MHz and employing known techniques for making the additional components.

We claim:

1. A method of analogically modulating an optical signal in correspondence with a signal of a frequency within a band of predetermined width, comprising:

feeding an optical input signal to an electro-optical modulator;

feeding an external electric signal of a frequency within said band to a linearizer circuit and correspondingly generating at the output a predistorted electric signal having a predistortion of predetermined characteristics;

feeding said predistorted electric signal to the input of said electro-optical modulator;

feeding an electric bias signal to the input of said electro-optical modulator;

generating an optical modulated signal in said electro-optical modulator;

wherein said step of feeding an electric bias signal comprises:

generating an electric piloting tone signal at a predetermined frequency;

generating an electric control signal in correspondence with said modulated optical signal;

generating an electric bias signal in correspondence with said electric control signal, said pilot tone and with a reference signal of predetermined voltage, in combination with each other;

characterized in that it further comprises:

feeding said pilot tone in superposition with said external electric signal to the input of said linearizer circuit;

attenuating said pilot tone at the output of said linearizer circuit before feeding said predistorted electric signal to said electro-optical modulator.

2. A method of analogically modulating an optical signal according to claim 1, characterized in that said predetermined frequency is external to said band of predetermined width.

3. A method of analogically modulating an optical signal according to claim 1, characterized in that said step of generating an electric control signal comprises separating a fraction of said modulated optical signal and detecting an electric feedback signal corresponding thereto.

4. A method of analogically modulating an optical signal according to claim 3, characterized in that said step of generating an electric control signal comprises drawing the component at said predetermined frequency from said electric feedback signal.

5. A method of analogically modulating an optical signal according to claim 3, characterized in that it comprises the steps of:

generating first and second electric piloting tone signals, at first and second predetermined frequencies, respectively;

feeding said first and second pilot tones in superposition with said external electric signal to the input of said linearizer circuit;

attenuating said first and second pilot tones at the output of said linearizer circuit before feeding said predistorted signal to said electro-optical modulator, and wherein said step of generating an electric control signal comprises drawing, from said electric feedback signal, the component at the frequency difference between said first and second predetermined frequencies.

6. A method of analogically modulating an optical signal according to claim 5, characterized in that said first and second predetermined frequencies are external of said band of predetermined width.

7. A method of analogically modulating an optical signal according to claim 5, characterized in that it comprises:

drawing from said electric loop signal, a second component at the frequency difference between twice one of said first and second predetermined frequencies and the other of said first and second predetermined frequencies;

generating a linearization control signal based on said second component;

controlling said linearizer in a parametric manner, based on said linearization control signal, so as to minimize the third-order distortions of said modulated optical signal.

8. A method of analogically modulating an optical signal according to claim 1, characterized in that said external electric signal comprises at least two spaced apart frequencies in said band and said step of generating a predistorted electric signal comprises generating second-order and third-order intermodulation products between said frequencies and pilot tone, of such characteristics that they are superposed in substantial phase opposition to the corresponding intermodulation products generated within said electro-optical modulator.

9. A method of analogically modulating an optical signal according to claim 1, characterized in that it comprises attenuating said pilot tone by at least 10 dB at the output of said linealizer circuit.

10. A method of analogically modulating an optical signal according to claim 9, characterized in that said step of attenuating said pilot tone at the output of said linearizer circuit comprises filtering said pilot tone by a band-stop filter.

11. A method of analogically modulating an optical signal according to claim 9, characterized in that said step of attenuating said pilot tone at the output of said linearizer circuit comprises adding, at the output of said linearizer circuit, a signal obtained in correspondence to said pilot tone, varying the phase and width of same of predetermined quantities.

12. An analog-external-modulation optical emitter comprising an optical source, an electro-optical modulator and a piloting circuit of said electro-optical modulator, said electro-optical modulator having:

an optical input for an optical signal, in connection with said optical source, a first electric input for a modulating voltage, a second electric input for a bias voltage, and an optical output carrying an analog modulated optical signal, an optical coupler being connected to said optical output of said modulator, which optical coupler has a branch carrying one modulated-optical-signal portion in connection with an optical receiver, adapted to generate an optical control signal in correspondence with said optical signal;

in which said piloting circuit comprises:

an input for an analog external electric signal, a linearizer circuit receiving said external signal and connected to said first electric input of said electrooptical modulator;

an input for a predetermined bias voltage;

an input for said electric control signal generated by said optical receiver;

a circuit generating an electric piloting tone signal;

said predetermined bias voltage and electric control signal being fed to the input of a differential amplifier, the output of said differential amplifier being combined with said electric piloting circuit and the combination being fed to said second electric input of said electro-optical modulator;

characterized in that the circuit generating an electric piloting signal is also connected, via a band-pass filter and an attenuator-phase shifter circuit, to the input of said linearizer circuit and the output of said linearizer circuit is then sent to said first electric input of said electro-optical modulator by interposition of a band-stop filter adapted to eliminate said electric piloting signal downstream of said linearizer circuit.

* * * * *

UNITED STATES PATENT AND TRADEMARK OFFICE
CERTIFICATE OF CORRECTION

PATENT NO. : 5,812,297
DATED : Sept. 22, 1998
INVENTOR(S) : Mussino et al

It is certified that error appears in the above-identified patent and that said Letters Patent is hereby corrected as shown below:

Col. 1, line 44, change "inflexion" to --inflection--;

Col. 7, line 20, change "13" to --23--;

Col. 8, line 31, change "predistorsion" to --predistortion--;

Col. 11, line 49, change "piloting" to --pilot--;

Col. 12, line 14, change "piloting" to --pilot--;

Col. 14, lines 2 and 3, change "elec-trooptical" to --electro-optical--;

Col. 14, line 7, change "piloting" to --pilot--.

Signed and Sealed this

Twenty-ninth Day of June, 1999

Attest:

Q. TODD DICKINSON

Attesting Officer      Acting Commissioner of Patents and Trademarks